US012224505B2

(12) United States Patent
Yang et al.

(10) Patent No.: US 12,224,505 B2
(45) Date of Patent: Feb. 11, 2025

(54) ANTENNA AND BASE STATION

(71) Applicant: Nokia Shanghai Bell Co., Ltd., Shanghai (CN)

(72) Inventors: Wenmin Yang, Shanghai (CN); Qiang Liu, Shanghai (CN)

(73) Assignee: Nokia Shanghai Bell Co., Ltd., Shanghai (CN)

( * ) Notice: Subject to any disclaimer, the term of this patent is extended or adjusted under 35 U.S.C. 154(b) by 127 days.

(21) Appl. No.: 17/949,341

(22) Filed: Sep. 21, 2022

(65) Prior Publication Data

US 2023/0092210 A1 Mar. 23, 2023

(30) Foreign Application Priority Data

Sep. 22, 2021 (CN) .......................... 202111107680.3

(51) Int. Cl.
*H01Q 1/24* (2006.01)
*H01Q 1/36* (2006.01)
*H01Q 9/04* (2006.01)

(52) U.S. Cl.
CPC ........... *H01Q 9/0421* (2013.01); *H01Q 1/246* (2013.01); *H01Q 1/36* (2013.01)

(58) Field of Classification Search
CPC .......... H01Q 9/0421; H01Q 1/36; H01Q 1/52; H01Q 1/42; H01Q 17/00; H01Q 17/008; H01Q 19/06
See application file for complete search history.

(56) References Cited

U.S. PATENT DOCUMENTS 3,066,291 A * 11/1962 Alford ..................... H01Q 3/12 333/261
3,285,129 A * 11/1966 Marcatili ................. G02B 3/04 359/720

(Continued)

FOREIGN PATENT DOCUMENTS

CA 2259725 A1 * 7/1999 ............. H01L 28/40
CN 105390816 B * 5/2018

(Continued)

OTHER PUBLICATIONS

Search Report for European Application No. 22195846.5 dated Feb. 20, 2023.

*Primary Examiner* — Hai V Tran
*Assistant Examiner* — Jordan E. DeWitt
(74) *Attorney, Agent, or Firm* — Harness, Dickey & Pierce, P.L.C

(57) ABSTRACT

The antenna includes a plurality of radiating units arranged by column and including a plurality of radiating bodies and a reflecting plate which is configured to reflect a portion of electromagnetic waves radiated by the plurality of radiating bodies, such that the electromagnetic waves are radiated in a radiation orientation; and a dielectric component arranged in the radiation orientation of at least one radiating unit of the plurality of radiating units and including an undulating portion spaced apart from the at least one radiating unit by a distance, wherein a first undulating structure is provided on a lower surface of the undulating portion at least facing the at least one radiating unit in a transverse direction, the transverse direction being vertical to the column and parallel to the reflecting plate.

12 Claims, 8 Drawing Sheets

(56) References Cited

U.S. PATENT DOCUMENTS

| | | | | | |
|---|---|---|---|---|---|
| 3,633,206 | A * | 1/1972 | McMillan | H01Q 15/0026 | 343/781 R |
| 4,164,718 | A * | 8/1979 | Iwasaki | H01P 1/264 | 333/81 R |
| 4,893,299 | A * | 1/1990 | Humberstone | G11B 11/10 | |
| 5,278,720 | A * | 1/1994 | Bird | H01T 4/08 | 361/120 |
| 11,374,331 | B1 * | 6/2022 | Chen | H01Q 1/24 | |
| 2001/0002164 | A1 * | 5/2001 | Ludwing | F21S 8/04 | 362/558 |
| 2003/0085129 | A1 * | 5/2003 | Shishido | C25D 9/04 | 205/333 |
| 2005/0206575 | A1 * | 9/2005 | Chadwick | H01Q 21/0087 | 343/797 |
| 2006/0202909 | A1 * | 9/2006 | Nagai | H01Q 15/08 | 343/910 |
| 2006/0285184 | A1 * | 12/2006 | Phillips | G02B 5/287 | 359/2 |
| 2010/0220024 | A1 * | 9/2010 | Snow | H01Q 9/28 | 343/753 |
| 2010/0266238 | A1 * | 10/2010 | Bowers | G02B 27/56 | 385/30 |
| 2012/0126911 | A1 * | 5/2012 | Romanko | H01Q 1/52 | 333/24.2 |
| 2012/0280874 | A1 * | 11/2012 | Kim | H01Q 21/08 | 343/763 |
| 2014/0261652 | A1 * | 9/2014 | Lochtefeld | H01L 31/0687 | 438/71 |
| 2015/0036303 | A1 * | 2/2015 | Yosui | H01P 3/085 | 361/752 |
| 2015/0210106 | A1 * | 7/2015 | Sun | B42D 25/324 | 359/566 |
| 2017/0205666 | A1 * | 7/2017 | Suh | G02F 1/133617 | |
| 2018/0212327 | A1 * | 7/2018 | Tsutsumi | H01Q 17/001 | |
| 2018/0294557 | A1 * | 10/2018 | Lu | H01Q 19/067 | |
| 2018/0359845 | A1 * | 12/2018 | Park | H01P 3/085 | |
| 2019/0214418 | A1 * | 7/2019 | Sasaki | H01L 27/14621 | |
| 2020/0044327 | A1 * | 2/2020 | Ding | H01Q 21/29 | |
| 2020/0064195 | A1 * | 2/2020 | Gallinet | G01J 3/1895 | |
| 2021/0020671 | A1 * | 1/2021 | Cheng | H01L 27/1464 | |
| 2021/0162794 | A1 * | 6/2021 | Hu | B42D 25/45 | |
| 2021/0226336 | A1 * | 7/2021 | Rojas | H01Q 9/0471 | |
| 2021/0265722 | A1 * | 8/2021 | Kaistha | H01Q 1/002 | |
| 2022/0238572 | A1 * | 7/2022 | Wu | H01L 27/14685 | |
| 2022/0334245 | A1 * | 10/2022 | Baur | H01Q 1/3233 | |
| 2022/0416432 | A1 * | 12/2022 | Chan | H01Q 1/243 | |
| 2023/0092210 | A1 * | 3/2023 | Yang | H01Q 9/0421 | 343/702 |
| 2023/0305379 | A1 * | 9/2023 | Takagi | G03B 21/2066 | |
| 2024/0072429 | A1 * | 2/2024 | Talai | H01Q 1/32 | |

FOREIGN PATENT DOCUMENTS

| | | | | | |
|---|---|---|---|---|---|
| CN | 111342207 | A | * | 6/2020 | H01Q 1/243 |
| CN | 109643839 | B | * | 2/2021 | H01Q 1/12 |
| CN | 113785226 | A | * | 12/2021 | H01Q 15/08 |
| JP | 2007235287 | A | * | 9/2007 | |
| JP | 2014069634 | A | * | 4/2014 | B60E 13/005 |
| JP | 2019041224 | A | * | 3/2019 | |
| JP | 2019190928 | A | * | 10/2019 | |
| JP | 2021032846 | A | * | 3/2021 | G01S 13/931 |
| WO | WO-2020200070 | A1 | * | 10/2020 | B42D 25/21 |
| WO | WO-2020261922 | A1 | * | 12/2020 | G01S 13/931 |
| WO | WO-2023240396 | A1 | * | 12/2023 | H01Q 1/38 |
| WO | WO-2024018995 | A1 | * | 1/2024 | |

* cited by examiner

ANTENNA AND BASE STATION

CROSS-REFERENCE TO RELATED APPLICATIONS

This application claims priority under 35 U.S.C. § 119 to Chinese Application No. 202111107680.3, filed Sep. 22, 2021, the entire contents of which are hereby incorporated by reference.

FIELD

Embodiments of the present disclosure relate to an antenna and a base station.

BACKGROUND

The wireless mobile communication industry is now booming. Capacity of a wireless mobile communication system is closely related to usage of frequency. The frequency spectrum on which the wireless communication devices rely is a finite natural resource. A main issue of the radio communication system is the limited availability of the radio-frequency spectrum due to high demand. As such, an ideal mobile system is defined by a system operating within a limited assigned frequency band and serving an almost unlimited number of users.

This inevitably involves the provision of radio coverage in a number of frequency bands and complicates the design of the network base transceiver stations. With respect to antennas, the expense of multiple base-station antenna installations and public resistance to unsightly antenna placements has motivated the installation of multiband antennas at base-stations and thus avoids an increase of antenna masts and payloads. The multiband antenna is an antenna designed to operate in multiple bands of frequencies. Multiband antennas use a design in which one part of the antenna is active for one band, while another part is active for a different band. Multiband antennas are usually expected to demonstrate comparable performance measures in each of their operating bands.

SUMMARY

In the first aspect of the present disclosure, an antenna is provided. The antenna comprises a plurality of radiating units arranged by column and comprising a plurality of radiating bodies and a reflecting plate which is configured to reflect a portion of electromagnetic waves radiated by the plurality of radiating bodies, such that the electromagnetic waves are radiated in a predetermined radiation orientation; and a dielectric component arranged in the radiation orientation of at least one radiating unit of the plurality of radiating units and comprising an undulating portion spaced apart from the at least one radiating unit by a predetermined distance, wherein a first undulating structure is provided on a lower surface of the undulating portion at least facing the at least one radiating unit in a transverse direction, the transverse direction being vertical to the column and parallel to the reflecting plate.

In some embodiments, a second undulating structure is provided on an upper surface of the undulating portion away from the at least one radiating unit in the transverse direction.

In some embodiments, the second undulating structure and the first undulating structure have the same shape and dimension, such that the dielectric component has a uniform thickness.

In some embodiments, dimension of the undulating portion is related to radiation frequency of the at least one radiating unit.

In some embodiments, the predetermined distance is an integer multiple of ¼ of a radiation wavelength of the at least one radiating unit.

In some embodiments, the undulating portion comprises a plurality of undulating units arranged along the transverse direction and each extending along the column, and wherein a width of each of the plurality of undulating units in the transverse direction is inversely proportional to a central frequency of a radiation band of the at least one radiating unit.

In some embodiments, the undulating unit comprises a pair of inclined segments at a predetermined angle to each other, wherein the predetermined angle is related to a band of the at least one radiating unit and the predetermined distance.

In some embodiments, a height of the undulating portion is inversely proportional to a central frequency of a radiation band of the at least one radiating unit.

In some embodiments, a sectional shape of the undulating portion comprises at least one of triangular wave shape, trapezoidal wave shape and sinusoidal wave shape.

In some embodiments, the at least one radiating unit is a high-frequency radiating unit of the plurality of radiating units.

In some embodiments, the antenna further comprises an antenna radome arranged in the radiation orientation to cover the plurality of radiating units.

In some embodiments, the dielectric component is supported on the reflecting plate.

In a second aspect of the present disclosure, a base station is provided. The base station comprises at least one antenna as described in the first aspect.

It should be appreciated that the contents described in this Summary are not intended to identify key or essential features of the embodiments of the present disclosure, or limit the scope of the present disclosure. Other features of the present disclosure will be understood more easily through the following description.

BRIEF DESCRIPTION OF THE DRAWINGS

Through the following more detailed description of the example embodiments with reference to the accompanying drawings, the above and other objectives, features and advantages of the present disclosure will become more apparent. In the example embodiments of the present disclosure, same reference sign usually indicates the same component.

Throughout the drawings, same or similar reference signs indicate same or similar elements.

DETAILED DESCRIPTION OF EMBODIMENTS

Figure 1:
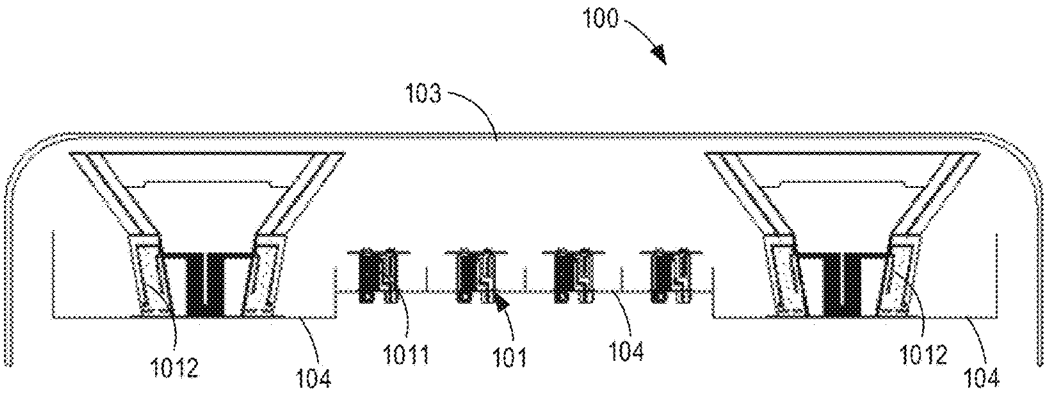
FIG. 1 illustrates a side view schematic of a traditional multi-band antenna.

The present disclosure is now described with reference to several example embodiments. It should be appreciated that description of those embodiments is merely to enable those skilled in the art to better understand and further implement the present disclosure and is not intended for limiting the scope of the technical solution disclosed herein.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to apply such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to limit example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "comprises" and its variants are to be read as open-ended terms that mean "includes, but is not limited to." The term "based on" is to be read as "based at least in part on." The term "one embodiment" and "an embodiment" are to be read as "at least one embodiment." The term "a further embodiment" is to be read as "at least one further embodiment."

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including any claims. As a further example, as used in this application, the term circuitry also covers an implementation of only a hardware circuit or processor (or multiple processors) or portion of a hardware circuit or processor and its (or their) accompanying software and/or firmware. The term circuitry also covers, for example, and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future types of communication technologies and systems with which the present disclosure may be embodied. The scope of the present disclosure should not be seen as limited to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but is not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

The term "antenna" here is a transducer that transduces guided waves propagating on transmission lines into electromagnetic waves transmitting in an unbounded medium (free space in general), or in a reverse way. The term "frequency band" denotes a frequency range of the electromagnetic waves that can be handled by the antenna or its radiating units, in unit of Hz. In order to rationally use the frequency spectrum resources and ensure that no interferences occur between various industries and business while they are using the frequency spectrum resources, the International Telecommunication Union Radiocommunication Sector (ITU-R) formulated international radio regulations, which set a uniform frequency range for the radio frequency bands used by different business and communication systems. Multi-band antenna refers to an antenna system capable of handling a plurality of frequency bands simultaneously.

The frequency bands handled by the multi-band antenna include high-frequency band, medium-frequency band and/or low-frequency band. It should be understood that high-frequency band, medium-frequency band and low-frequency band here do not necessarily indicate that the absolute frequency is respectively in a high, medium or low band. Instead, it is a relative concept. In other words, of the handled frequency bands, the highest frequency band is referred to as high-frequency band in the multi frequency band. Similarly, the lowest frequency band in the handled frequency bands is called low-frequency band in the multi frequency band. The frequency band between the high-frequency and low-frequency bands may include medium-frequency band. The radiating units for the high-frequency band in the antenna usually are small-sized and most influenced by the environment due to a relatively long wavelength of the electromagnetic waves radiated by it.

There are many critical parameters available for measuring performance of the antenna, such as gain, aperture or radiation pattern, polarization, efficiency and bandwidth, which may typically be adjusted during designing of an antenna. Besides, the transmitting antenna has the maximum rated power, while the receiving antenna has noise suppression parameter.

"Gain" represents a logarithm of a ratio of an intensity of the radiation pattern of the antenna to an intensity of a reference antenna in the strongest radiation direction. If the reference antenna is an omnidirectional antenna, the gain is indicated in dBi. For example, the gain of the dipole antenna is 2.14 dBi. The dipole antenna is often used as the reference antenna (as the perfect omnidirectional reference antenna cannot be manufactured). In such case, the gain of the antenna is in units of dBd.

Antenna gain is a passive phenomenon, which means that the antenna does not increase excitation, but only redistributes it to radiate more energy in a given direction than the omnidirectional antenna. If the gain of the antenna is positive in certain directions, the gain of the antenna in other directions is negative due to the energy conservation of the antenna. Thus, the gain to be reached by the antenna depends on a balance between the coverage of the antenna and the gain of the antenna.

"Aperture" and "radiation pattern" are closely related to the gain. "Aperture", which is two-dimensional, refers to a sectional shape of a "beam" in the maximum gain direction. Sometimes, the aperture is denoted as a radius of a circle approximate to the section or an angle of the beam cone. The radiation pattern is a three-dimensional pattern representing the gain. However, in general, only the horizontal and vertical two-dimensional sections of the radiation pattern are taken into account. The high-gain antenna radiation pattern is often accompanied by "side lobes", which refer to beams in the gain except for the main lobe ("beam" with highest gain).

The gain represents a ratio of power density of signals generated by the actual antenna to power density of signals generated by the ideal radiating units at the same point of the space in the case where the input power is equal. The gain quantitatively describes an extent to which an antenna converges the input power for radiation. Apparently, the gain has a close relationship with the antenna pattern. The narrower the main lobe of the pattern gets, the smaller the side lobe, and the higher the gain. The physical meaning of the gain may be interpreted in the following way: if an ideal nondirectional point source acts as the transmit antenna, in order to generate a signal of a given size at a point at a certain distance, an input power of 100 W is required. In contrast, when a directional antenna having a gain of G=13 dB=20 serves as the transmit antenna, only 5 W input power is required (100/20=5 W). That is, the gain of a certain antenna, in terms of the radiation effects of the antenna in the maximum radiation direction, refers to the multiple by which the input power is amplified compared to a nondirectional ideal point source.

The existing communication technology has developed into the fifth generation new radio, also known as 5G NR. The antenna device usually consists of larger antenna arrays, such as a lot of antenna elements (AE) to form the multi-band antenna. For example, the antenna device used in the radio cellular network often includes an antenna array containing 192 AE (96 dual-polarized patch) to synthesize the desired beam pattern.

FIG. 1 illustrates a side view of a traditional multi-band antenna 100. As shown, the antenna 100 generally comprises an antenna system and an antenna radome 103. The antenna system typically comprises radiating units 101 which typically comprises an antenna dipole, a feed network and a reflecting plate 104. In a multi-band antenna 100, the radiating units 101 at least comprises a high-frequency radiating unit 1011 and a low-frequency radiating unit 1012, each for radiating electromagnetic waves in different bands.

The reflecting plate 104 can reflect a part of the radiated electromagnetic waves, so as to radiate the electromagnetic waves in a predetermined radiation orientation. The radiation orientation herein may comprise a plurality of cone-shaped radiation directions. Multiple columns of high-frequency radiating units 1011 and multiple columns of low-frequency radiating units 1012 are arranged on the reflecting plate 104. In FIG. 1, the column extends along a direction vertical to the paper. The antenna 100 illustrated in FIG. 1 is provided with two columns of low-frequency radiating units 1012 and four columns of high-frequency radiating units 1011 interposed between the low-frequency radiating units 1012. It is to be understood that the high-frequency radiating units 1011 or the low-frequency radiating units 1012 in the same antenna 100 may involve a plurality of frequency bands with relatively higher or lower frequencies. For example, the high-frequency radiating units 1011 in each of the four columns of high-frequency radiating units 1011 in FIG. 1 may have different radiation bands. The antenna radome 103 is a structural member that keeps the antenna system from being affected by the external environment, such as rain, snow, wind or sand etc.

In comparison to the low-frequency radiating units 1012, the high-frequency radiating units 1011 are greatly affected by the environment due to its relatively high bands. In addition, since the high-frequency radiating units 1101 is generally small in size, when the high-frequency radiating units 1101 are disposed in the multi-band antenna 100, they may also be greatly affected by the surrounding low-frequency radiating units 1012 and the antenna radome 103.

To be specific, in antenna 100, especially multi-band or high-band antenna, the electromagnetic (EM) characteristics of a particular antenna element influence other elements, and the particular antenna element per se is also affected by the nearby elements. The interelement effect or mutual coupling between the antenna elements depends on a variety of factors including: quantity and type of the antenna elements, space between the elements, relative direction of the elements, radiation characteristics of the radiating body, scanning angle, bandwidth, arrival of signals of the direction events and composites of the feed network etc.

The impact on the antenna performance by the antenna radome 103 should not be overlooked either. In general, the antenna radome 103 is arranged in the radiation orientation of the electromagnetic waves radiated by the radiating units 101. Most of the electromagnetic waves can pass through the antenna radome 103 and continue to propagate outwards. Since the antenna radome 103 is made of dielectric materials, the electromagnetic waves may be partially absorbed and reflected. The electromagnetic waves reflected by the antenna radome 103 would form a parasitic source on the reflecting plate 104. The radiation formed by the parasitic source has a frequency different from the main radiation and would be superimposed with the main radiation, to thereby affect the performances of the antenna 100, e.g., terminal impedance, reflection coefficient, bandwidth and gain of the antenna elements etc., which are embodied in the radiation pattern of the radiating units 101.

Figure 2:
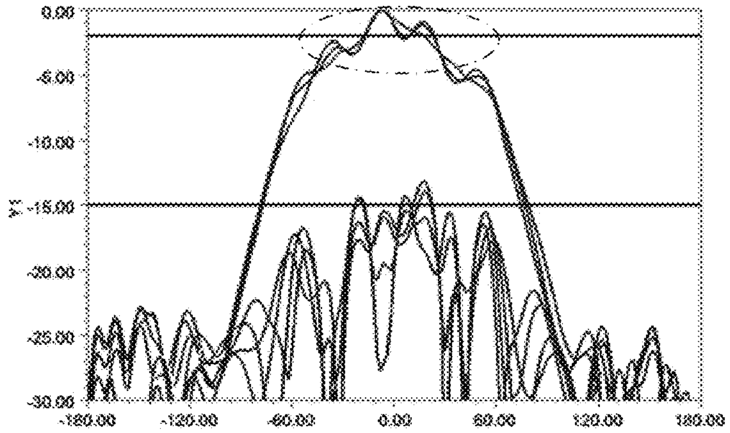
FIG. 2 illustrates a radiation pattern of a given column of high-frequency radiating units of a traditional multi-band antenna.

FIG. 2 illustrates a radiation pattern of a column of high-frequency radiating units 1011 in the traditional antenna 100. As shown in FIG. 2, for a single column of high-frequency radiating units 1011, the radiation pattern of the traditional high-frequency radiating units 1011 contains deformations, flat top and waves (as indicated by elliptical dotted box in FIG. 2) due to the influence of the above mentioned factors. This also reflects degradation of the antenna performance.

Figure 3:
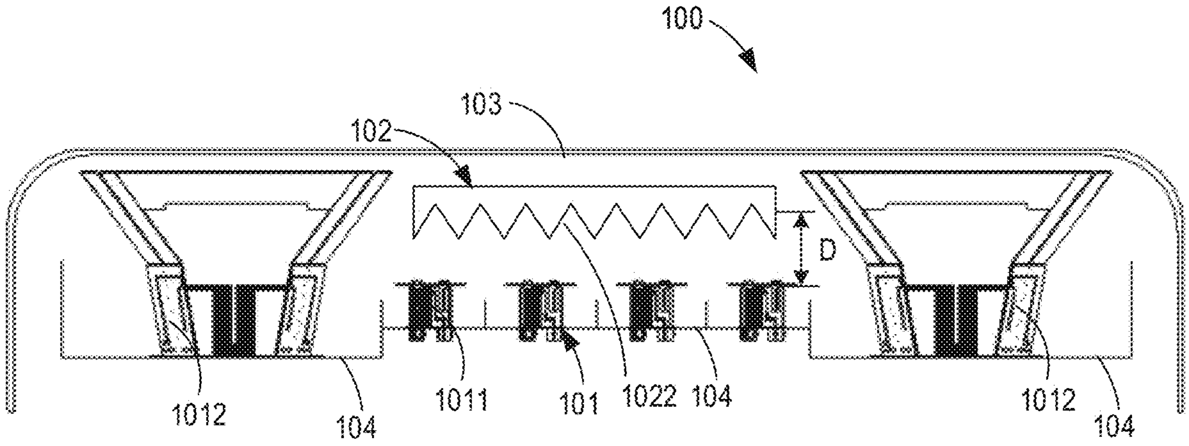
FIGS. 3 and 4 respectively illustrate side and top view schematics of the multi-band antenna in accordance with embodiments of the present disclosure.
Figure 4:
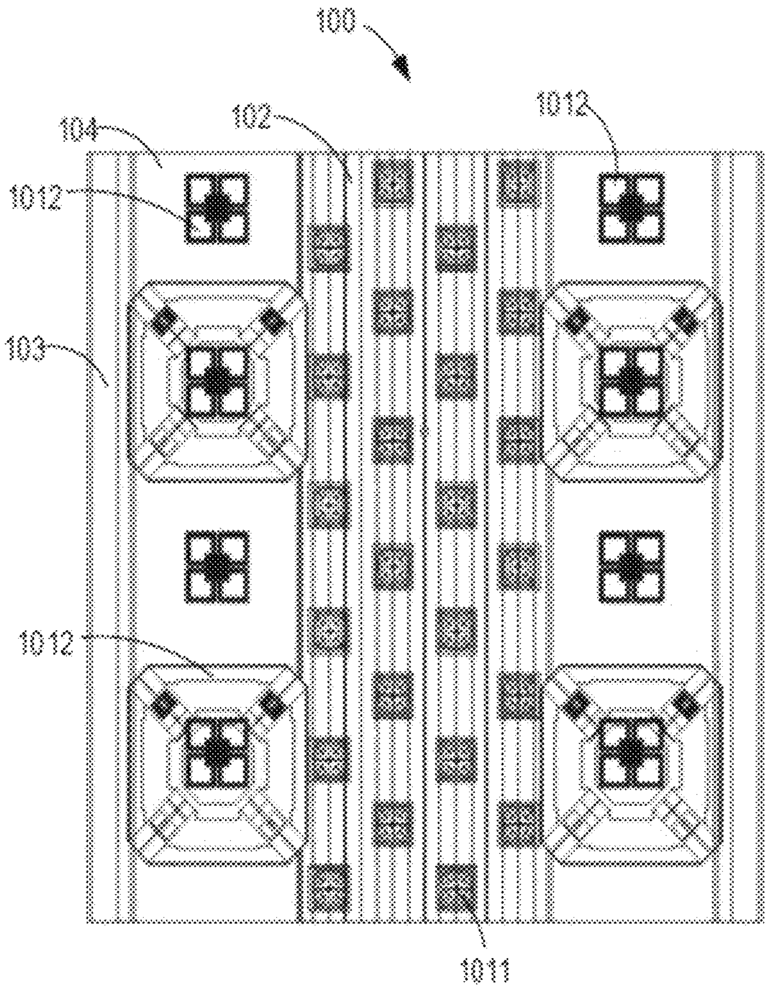

To solve or at least partially solve the above or other potential technical problems, an antenna 100 is provided in accordance with embodiments of the present disclosure. The antenna 100 mentioned here may be a multi-band antenna 100 or a high-band antenna 100, e.g., 5G MIMO antenna 100. FIG. 3 illustrates a side view of the multi-band antenna 100 as an example, and FIG. 4 shows a top view of the multi-band antenna 100. For a clear display, the antenna radome 103 is transparentized. According to FIGS. 3 and 4, the antenna 100 in accordance with embodiments of the present disclosure comprises a plurality of radiating units 101 and a dielectric component 102 having an undulating portion. The plurality of radiating units 101 are arranged by column and adapted to radiate the electromagnetic waves towards the predetermined radiation orientation. Each radiating unit 101 may include a radiating body such as a dipole and the reflecting plate 104. The reflecting plate 104 is provided to reflect a part of the electromagnetic waves radiated by the radiating body, such that the electromagnetic waves radiated by the radiating body are radiated in the predetermined radiation orientation. A plurality of radiating bodies may share one reflecting plate 104.

In the example antenna 100 shown in FIGS. 3 and 4, the radiating units 101 comprise high-frequency radiating units 1011 and low-frequency radiating units 1012. As shown in FIGS. 3 and 4, the antenna 100 has two columns of low-frequency radiating units 1012 and four columns of high-frequency radiating units 1011 interposed between the two columns of low-frequency radiating units 1012. In the case where the radiating units in multiple columns are all low-frequency radiating units 1012 or high-frequency radiating units 1011, the frequency bands corresponding to the multiple columns may also differ. For example, the high-frequency radiating units 1011 in the four columns may have two or more high frequency bands. For the same column of radiating units 101, the frequencies radiated by the radiating bodies may still be different.

It should be appreciated that the above embodiments where the multi-band antenna 100 is arranged as shown in FIGS. 3 and 4 are merely illustrative, without suggest any limitation as to the scope of the present disclosure. The radiating units 101 may also be arranged in any other suitable ways. For example, in some alternative embodiments, more columns of low-frequency radiating units 1012 or more columns of high-frequency radiating units 1011 may also be included, and the high-frequency radiating units 1011 and the low-frequency radiating units 1012 may be arranged in a staggered arrangement or the like.

The dielectric component 102 is disposed in the radiation orientation along which at least one of the plurality of radiating units 101 radiates the electromagnetic waves outwards. As the performance of the high-frequency radiating unit 1011 is more susceptible to external factors, the at least one radiating unit 101 (hereinafter also known as corresponding radiating unit) of the plurality of radiating units 101 provided with a dielectric component in the radiation orientation may refer to the high-frequency radiating unit 1011. As demonstrated in FIGS. 3 and 4, the dielectric component 102 is disposed in the radiation orientation of all high-frequency radiating units 1011. It should be understood without any doubts that the above embodiments are merely illustrative, without suggesting any limitation as to the scope of the present disclosure. Any other suitable arrangements are also feasible. For example, in some alternative embodiments, the dielectric component 102 may also be arranged on one or more of the plurality of columns of the high-frequency radiating units 1011 or on one or more high-frequency radiating units 1011 in a certain column of the high-frequency radiating units 1011, which will be discussed in detailed in the following.

The dielectric component 102 comprises an undulating portion spaced apart from the radiating unit 101 by a predetermined distance D as shown in FIG. 3. The predetermined distance D may indicate a distance from a central plane of the undulating portion to the top of the radiating body of the radiating unit 101. In some embodiments, the dielectric component 102 may be supported on the reflective plate 104 through appropriate structures, to make the undulating portion of the dielectric component 102 spaced apart from the radiating unit 101 by the predetermined distance D. In some alternative embodiments, the dielectric component 102 may also be suspended by suitable structures or adhered to the antenna radome 103. In some further alternative embodiments, the dielectric component 102 may also be the antenna radome 103 or a part thereof, which will be further elaborated in the following text.

On a lower surface of the undulating portion at least facing the radiating unit 101, an undulating structure (hereinafter referred to as first undulating structure 1022 to facilitate description) is provided along a transverse direction. The transverse direction denotes a direction that is vertical to the column and parallel to the reflecting plate 104. Due to the presence of the undulating portion, a part of the electromagnetic waves that are radiated outwards in the radiation orientation will be reflected by the first undulating structure 1022 of the undulating portion.

As previously mentioned, in the traditional scheme, a part of the electromagnetic waves is reflected by the antenna radome 103, resulting into multi-directional reflected electromagnetic waves. In addition, a considerable part of the reflected electromagnetic waves is reflected onto the reflecting plate 104 to form a parasitic source, which is detrimental to the performance of the antenna 100.

Different from this, because of the presence of the undulating portion, a majority of the electromagnetic waves reflected by the undulating portion will be reflected back to the radiating body, rather than the reflecting plate 104. The radiation generated by the parasitic source reflected back to the radiating body has the same frequency as the main radiation, and thus would not affect the radiation performance. In this way, the performance of the antenna 100 is improved, which is embodied in the radiation pattern of the single column of the high-frequency radiating units 1011.

Figure 5:
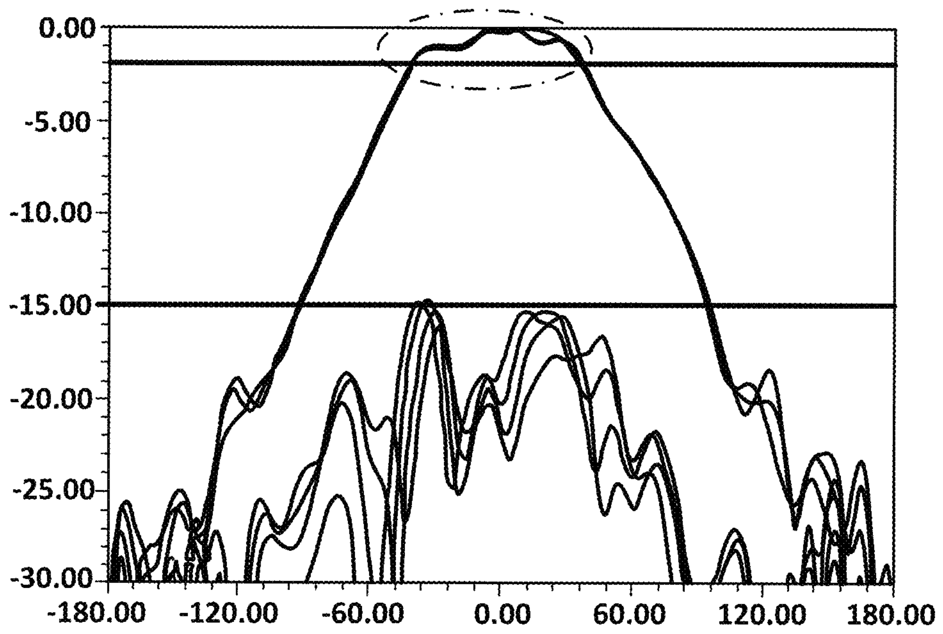
FIG. 5 illustrates a radiation pattern of a given column of high-frequency radiating units of the multi-band antenna in accordance with embodiments of the present disclosure.

FIG. 5 illustrates a radiation pattern of the single column of high-frequency radiating units 1011 when the dielectric component 102 with an undulating portion is used. Compared to the radiation pattern of the single column of high-frequency radiating units 1011 in the traditional antenna 100 as shown in FIG. 2, the beamwidth at 3 dB can be increased to about 90° and deformations and waves in the radiation pattern are flattened. In such case, an almost desired radiation pattern is obtained and the performance of the antenna 100 is further improved.

Accordingly, the performance of the antenna 100 can be effectively boosted by configuring an undulating portion having a first undulating structure at least on the lower surface. The upper surface of the undulating portion of the dielectric component 102 away from the radiating unit 101 may take any suitable shapes. As illustrated in FIG. 3, the upper surface of the undulating portion is of a flat structure. Because the lower surface is provided with the first undulating structure 1022 and the upper surface adopts a flat structure, the overall thickness of the undulating portion changes along with the variation of the first undulating structure 1022.

Figure 6:
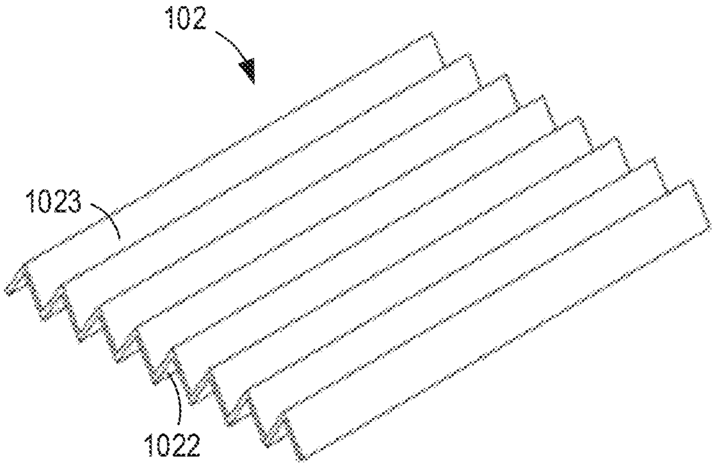
FIG. 6 illustrates a perspective view of the dielectric component in accordance with embodiments of the present disclosure.
Figure 7:
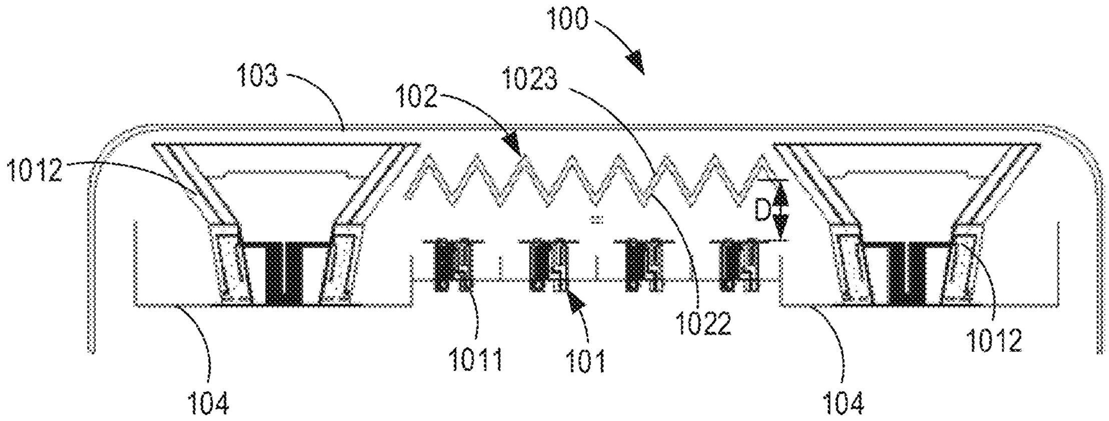
FIGS. 7 and 8 respectively illustrate a side view schematic and a perspective view of the multi-band antenna in accordance with embodiments of the present disclosure.
Figure 8:
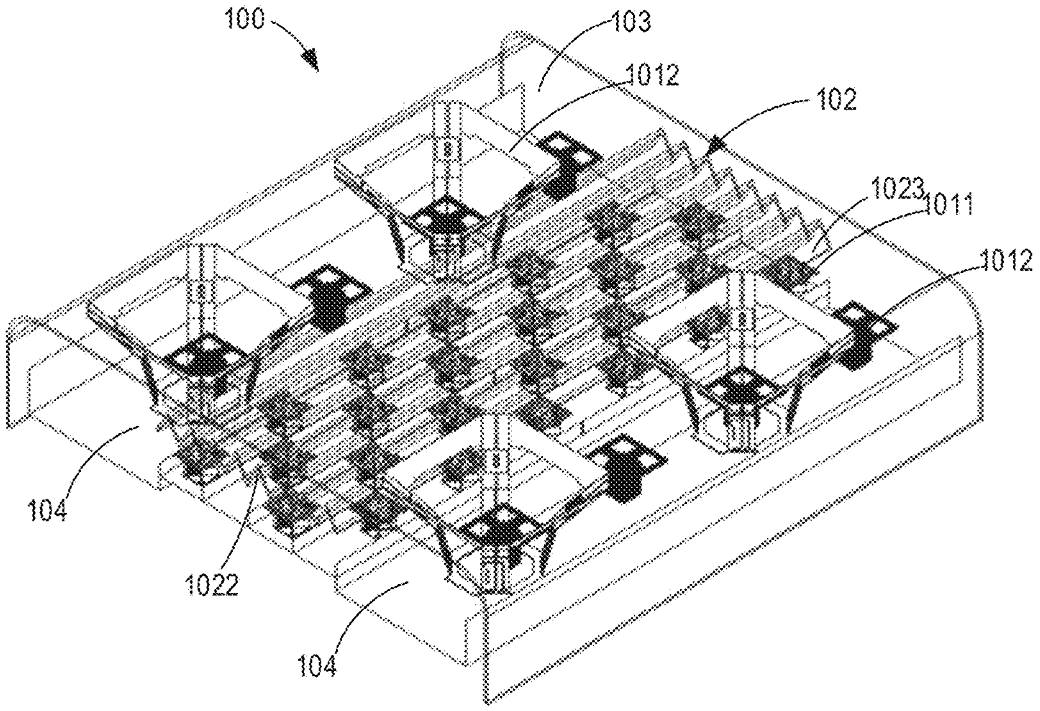

During the process of the electromagnetic waves penetrating the dielectric component 102, the transmittance of the electromagnetic waves is affected by different thicknesses of the dielectric component 102. In view of that, in some embodiments, an undulating structure is also provided, along a transverse direction, on the upper surface of the undulating portion of the dielectric component 102, i.e., a second undulating structure 1023, so as to further enhance the performance of the antenna 100. In some embodiments, the first undulating structure 1022 and the second undulating structure 1023 may have the same dimension and shape, such that the dielectric component 102 in general has a basically uniform thickness. FIG. 6 illustrates a perspective view of the dielectric component 102. FIGS. 7 and 8 respectively demonstrate a side view and a perspective view of the antenna 100 provided with the dielectric component 102 observed from different angles. The antenna radome 103 in FIG. 8 is made transparent to facilitate the display of the structure inside the antenna 100.

As stated above, a majority of the electromagnetic waves reflected by the undulating portion is reflected back to the radiating body that generates the main radiation. This eliminates the negative effects on the radiation pattern caused by the electromagnetic waves produced by the parasitic source on the reflecting plate 104. On this basis, when the upper surface of the undulating portion is provided with the second undulating structure 1023, the dielectric component 102 has an equal thickness. Accordingly, the influence of the dielectric component 102 on the transmission of electromagnetic waves in various directions is the same, so that a more optimized radiation pattern can be obtained. Since the radiation pattern reflects the antenna performance, so a more optimized radiation pattern demonstrates better performance of the antenna 100.

Figure 9:
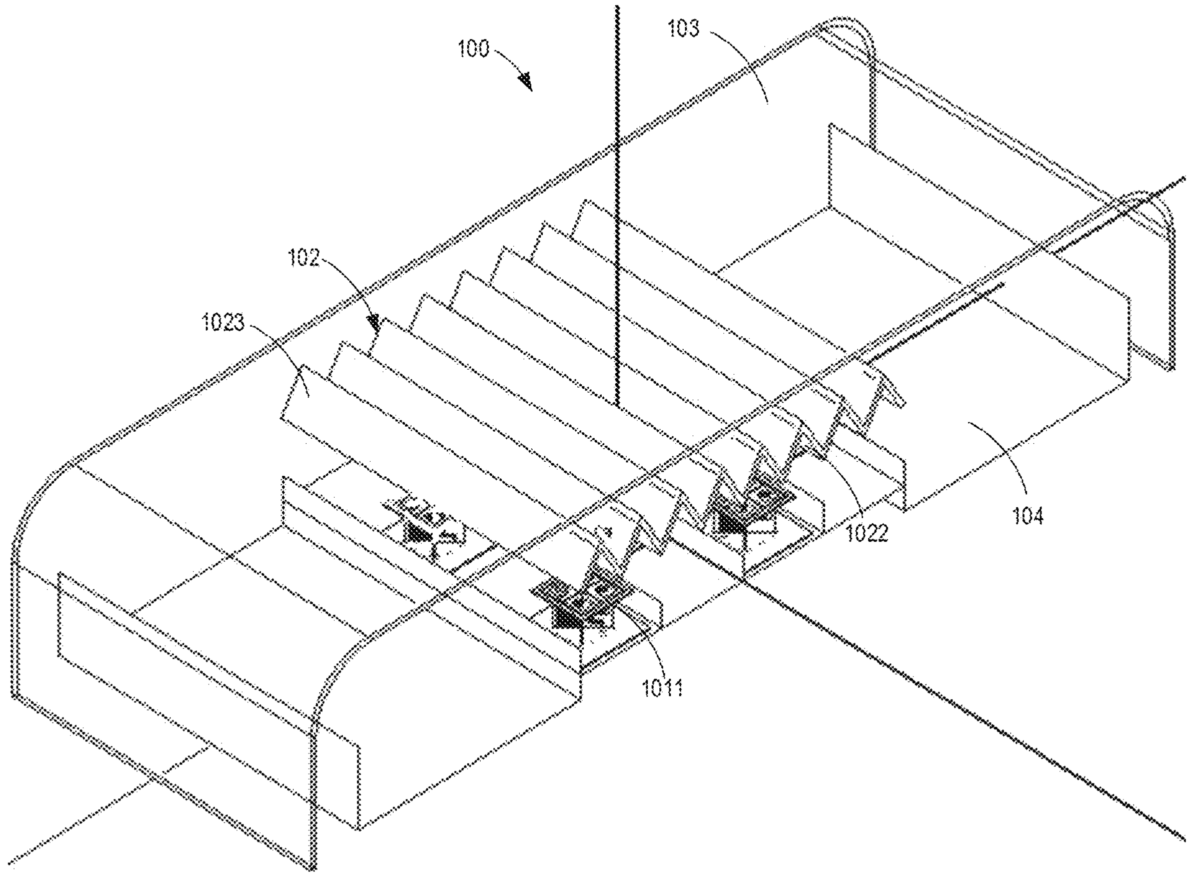
FIG. 9 illustrates a perspective view of a high-band antenna in accordance with embodiments of the present disclosure.

In addition to being arranged in the multi-band antenna 100 to optimize the antenna performance, the dielectric component 102 may also be applied into the high-band antenna 100, e.g., 5G MIMO antenna 100. FIG. 9 illustrates the high-band antenna 100 in which the dielectric component 102 is applied. Based on the same principle for the multi-band antenna 100, the dielectric component 102 having the undulating portion also can significantly improve the performance of the high-band antenna 100.

In some embodiments, the dimension of the undulating portion may be set to be related with the radiation frequency of the corresponding radiating unit 101, thereby allowing further optimization of the performance of the corresponding radiating unit 101 and even the whole antenna 100. The dimension of the undulating portion comprises the previously mentioned predetermined distance D by which the undulating portion is spaced apart from the corresponding radiating unit 101 as shown in FIG. 7.

In some embodiments, the predetermined distance D may be selected as ¼ wavelength of the radiation wavelength of the corresponding radiating unit 101 or an integer multiple of the ¼ wavelength. The radiation wavelength of the radiating unit 101 refers to a wavelength corresponding to the central frequency of the band of the electromagnetic waves radiated by the corresponding radiating unit 101. The central frequency of the band radiated by the radiating unit 101 usually indicates a resonance frequency of the radiating unit 101. For example, in some embodiments, the undulating portion is disposed at a position distanced from the corresponding radiating unit 101 by ¼ wavelength of the wavelength of the radiated electromagnetic waves, so as to acquire better antenna performance.

Figure 10:
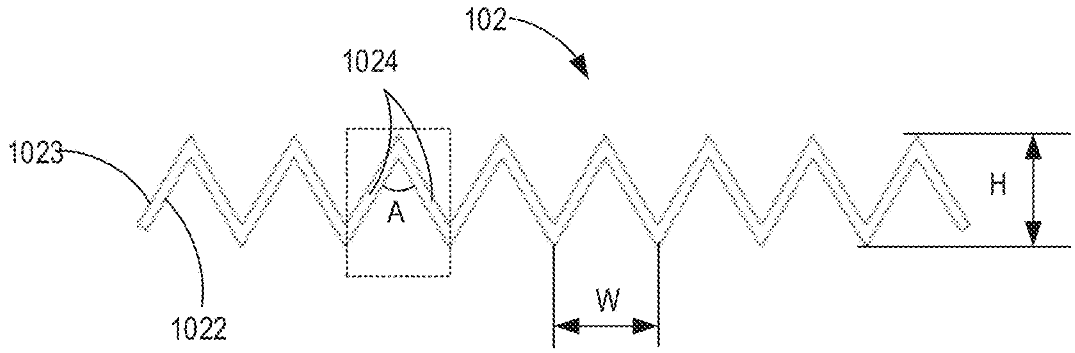
FIG. 10 illustrates a top view schematic of a dielectric component in accordance with embodiments of the present disclosure, wherein several dimensions of the dielectric component are demonstrated.

To further optimize the performance of the antenna 100, in addition to the aforementioned predetermined distance D between the undulating portion and the corresponding radiating unit 101, other dimensions of the undulating portion may also be further set and adjusted. The dimensions comprise a distance W between every two adjacent undulating units of a plurality of undulating units, a height H of the undulating portion and a predetermined angle A between inclined segments of the undulating units. To facilitate the explanation of the above dimensions of the undulating portion, FIG. 10 illustrates a side view schematic of the undulating portion. It can be seen from FIG. 10 that, the undulating portion may include a plurality of undulating units arranged along a direction vertical to the column, and one of the undulating units is shown in the dotted box of FIG. 10. In FIG. 10, every undulating unit extends along a direction vertical to the paper (i.e., extension direction of the column).

It can be seen from the side view of FIG. 10 that the undulating units may comprise a pair of inclined segments 1024, and the angle between the inclined segments in the undulating unit is the previously mentioned predetermined angle A. The distance W between every two adjacent undulating units is also known as the width of each undulating unit in the transverse direction. The height H of the undulating portion indicates a span of the undulating portion in a direction vertical to the reflecting plate 104.

In some embodiments, to further optimize the performance of the antenna 100, the height H of the undulating portion and the distance W between two adjacent undulating units are set to be inversely proportional to the central frequency of the radiation band of the corresponding radiating unit 101. In other words, the higher the central frequency of the radiation band of the corresponding radiating unit 101 is, the smaller the height H of the undulating portion and the distance W between two adjacent undulating units, and vice versa, so that the antenna performance can be more optimized.

With respect to the predetermined angle A between the inclined segments, in some embodiments, the predetermined angle A is related to the band of the corresponding radiating unit 101 and the previously mentioned predetermined distance D between the undulating portion and the corresponding radiating unit 101. When the predetermined distance D between the undulating portion and the corresponding radiating unit 101 (i.e., usually being ¼ of the wavelength of the electromagnetic waves radiated by the corresponding radiating unit 101) is determined, the predetermined angle A is only related to the radiation band of the corresponding radiating unit 101. In such case, by reasonably setting the predetermined angle A in accordance with the radiation band, the antenna performance can be further optimized.

In the above embodiments, some features of the undulating portion are described by taking the sectional shape of undulating portion having a triangular wave shape as an example. It should be understood that this is merely illustrative, without suggesting any limitation as to the scope of the present disclosure. The sectional shape of the undulating portion may also adopt at least one of trapezoidal wave shape and sinusoidal wave (cosine wave) shape as long as it meets the above characteristics (such as dimension and the like) of the undulating portion.

Figure 11:
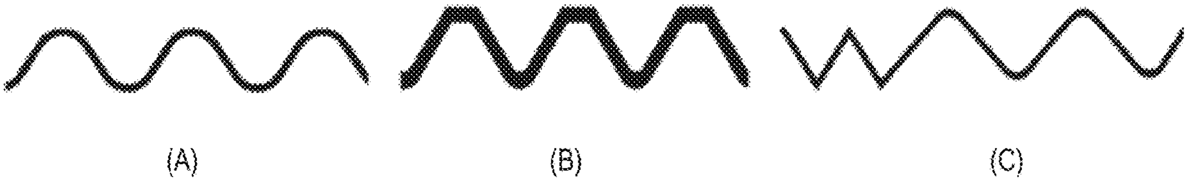
FIG. 11 illustrates several possible shapes of a sectional view of an undulating portion of the dielectric component in accordance with embodiments of the present disclosure.

FIG. 11 illustrates several examples of the possible sectional shapes of the undulating portion. As shown, the sectional shape of the undulating portion may have at least one of sinusoidal wave shape, trapezoidal wave shape and triangular wave shape or a combination thereof. For example, (A) of FIG. 11 illustrates that the sectional shape of the undulating portion may have the sinusoidal wave shape, and (B) of FIG. 11 illustrates that the sectional shape of the undulating portion may adopt a combination of trapezoidal wave and sinusoidal wave, where the sinusoidal wave and the trapezoidal wave shapes are arranged alternately. (C) of FIG. 11 shows that the sectional shape of the undulating portion is in the form of a combination of triangular wave and sinusoidal wave shapes, wherein the triangular wave and the sinusoidal wave shapes are respectively arranged at two ends of the arrangement direction of the undulating portion, instead of in an alternate manner. For example, the undulating portion of the triangular wave shape is arranged at a position near a first end in the arrangement direction, while the undulating portion of the sinusoidal wave shape is arranged at a position near a second end in the arrangement direction.

Of course, it is to be understood that the sectional shapes and the arrangement manners of the undulating portion as shown in FIG. 11 are merely illustrative, rather than exhaustive, and without suggesting any limitation as to the scope of the present disclosure. Any other suitable sectional shapes of the undulating portion may also be used as long as they meet the above characteristics (such as dimension and the like) of the undulating portion.

Figure 12:
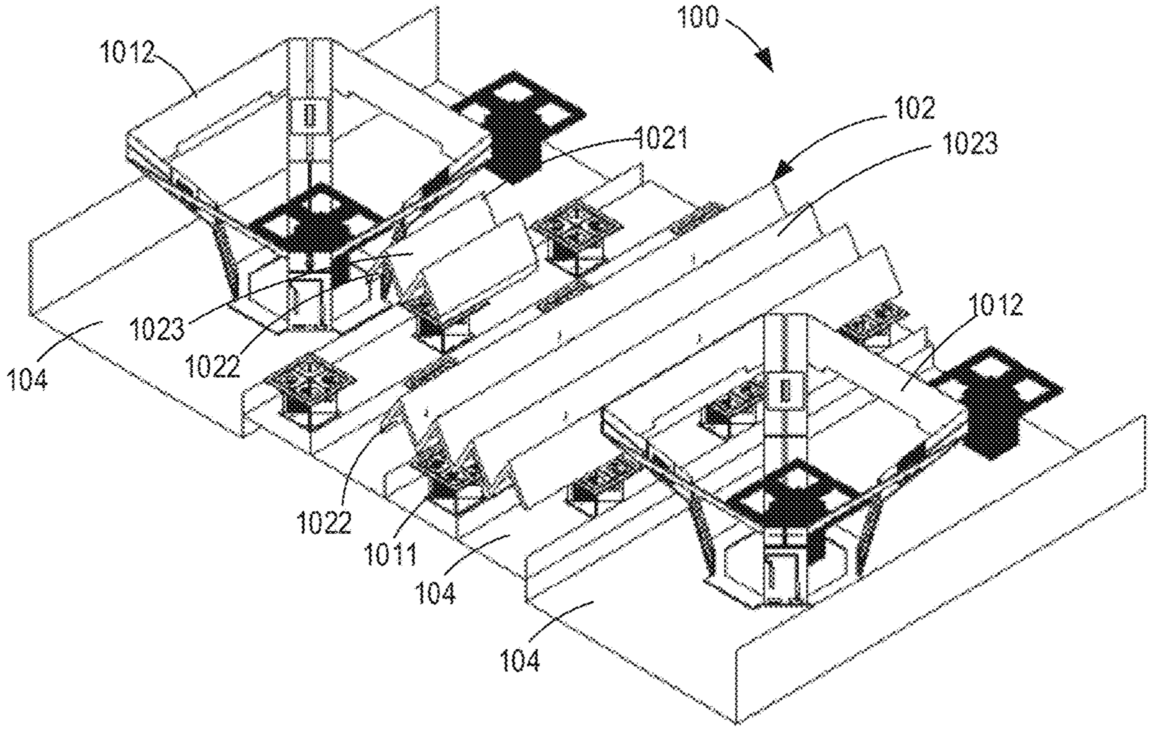
FIGS. 12 and 13 respectively illustrate a perspective view and a top view schematic of the dielectric component disposed above some high-frequency radiating units in accordance with embodiments of the present disclosure.
Figure 13:
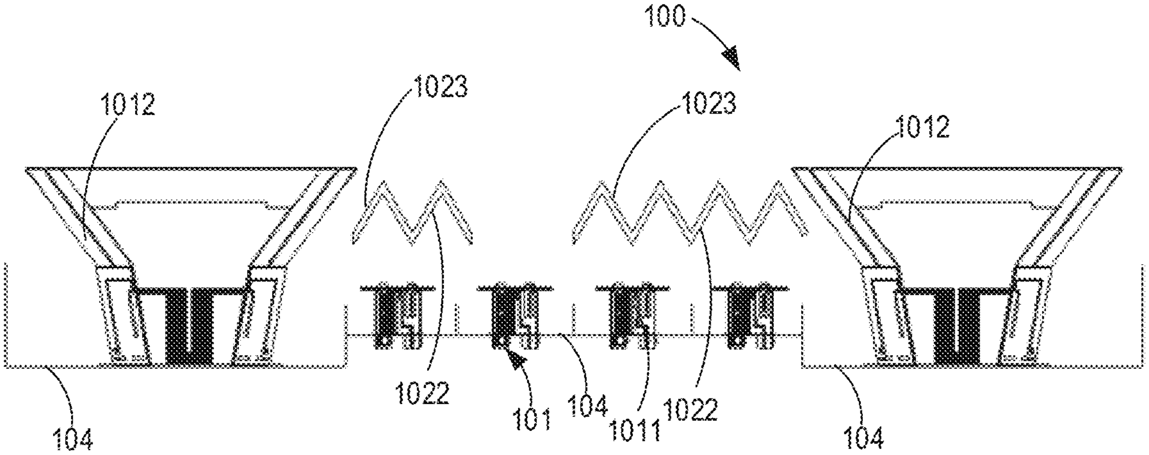

Embodiments in which the dielectric component 102 may be arranged over all high-frequency radiating units 1011 have been described above with reference to FIGS. 2 to 9. In addition to that, the dielectric component 102 may also be arranged on one or more of the plurality of columns of the high-frequency radiating units 1011 or on one or more high-frequency radiating units 1011 in a certain column of the high-frequency radiating units 1011 as stated above. FIGS. 12 and 13 respectively illustrate a perspective view and a side view of the dielectric component 102 arranged over one column of radiating units 101 in the high-frequency radiating units 1011, and over a certain radiating unit 101 in a further column of radiating units 101. In such way, the performance optimization is carried out for the given column of radiating units 101 or a certain radiating unit 101 as required.

In such case, as mentioned above, the dimensions (e.g., predetermined distance D spaced apart, height H of the undulating portion, width W of the undulating portion and the predetermined angle A) of the undulating portion arranged over a certain column of radiating units 101 or a certain radiating unit 101 may be adjusted in accordance with the radiation frequency of the corresponding column of radiating units 101 or the radiating unit 101, so as to further optimize the radiation performance of the corresponding radiating unit(s) 101.

In the previously described embodiments, the dielectric component 102 and the antenna radome 103 are respectively separated components, and the dielectric component 102 is disposed inside the antenna radome 103. In some embodiments, the dielectric constant of the dielectric component 102 may be set approximate or equal to the dielectric constant of the antenna radome 103. For example, in some embodiments, the dielectric component 102 may be made of the same material as the antenna radome 103.

Figure 14:
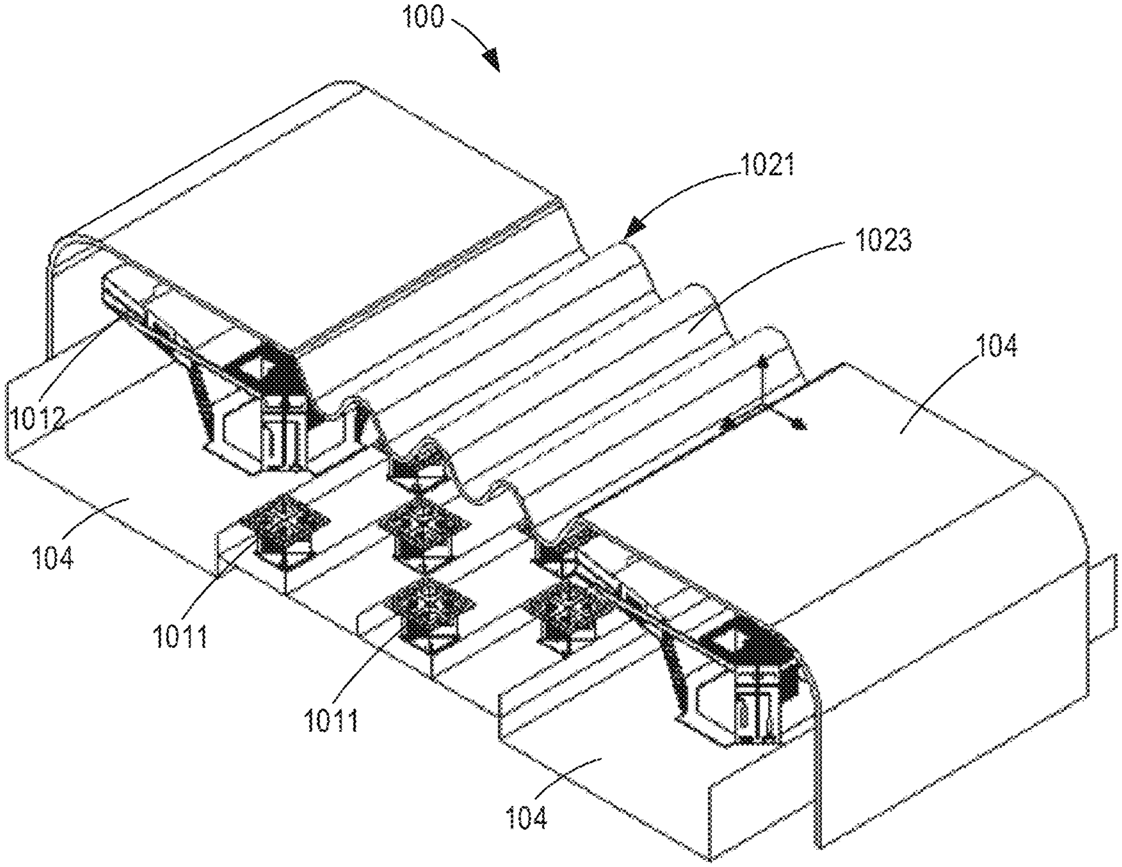
FIGS. 14 and 15 respectively illustrate a perspective view and a top view schematic of the dielectric component formed in the antenna radome in accordance with embodiments of the present disclosure.
Figure 15:
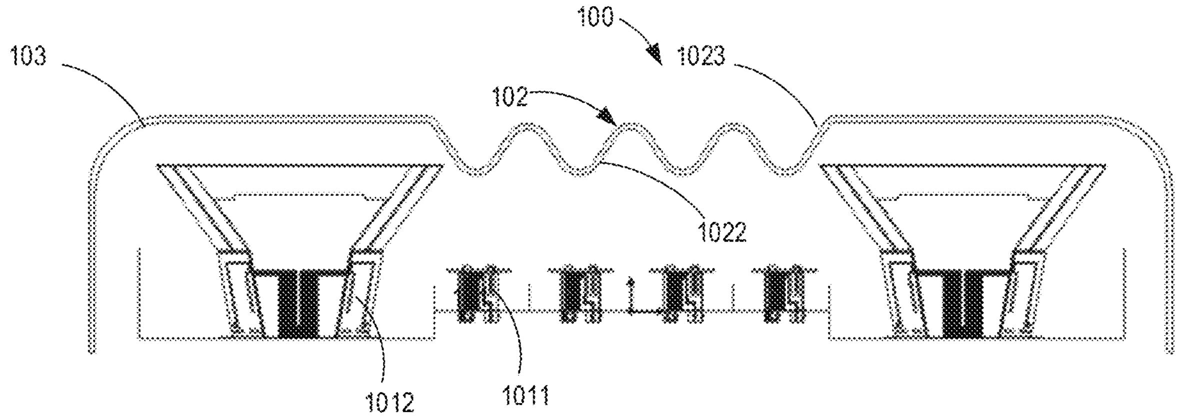

In some embodiments, the dielectric component 102 also may be at least a part of the antenna radome 103. FIGS. 14 and 15 respectively illustrate a perspective view and a side view of the dielectric component 102 being a part of the antenna radome 103. As shown in FIGS. 14 and 15, the portion of the antenna radome 103 corresponding to the high-frequency radiating unit 1011 is provided with the undulating portion, which is provided with the first undulating structure 1022 on the lower surface (i.e., a portion of the inner surface of the antenna radome 103) in the transverse direction, and the second undulating structure 102 on the upper surface (i.e., a portion of the outer surface of the antenna radome 103). Accordingly, it is unnecessary to additionally set a separated dielectric component 102 with undulating portion. Therefore, the structure of the antenna 100 can be further simplified while the performance of the antenna 100 is also optimized.

In accordance with embodiments of the present disclosure, a base station comprising at least one antenna 100 as described above is provided. By providing the dielectric component 102 with undulating portion in the antenna 100, the performance of the antenna 100 and the base station is optimized in a cost-effective way.

It also should be understood that the above detailed embodiments of the present disclosure are provided only for illustrating or explaining the principles of the present disclosure by examples, rather than restricting the present disclosure. Any modifications, equivalent substitutions, improvements and the like should be encompassed within the protection scope of the present disclosure as long as they are within the spirit and principle of the present disclosure. Meanwhile, the claims attached to the present disclosure are intended to cover all changes and modifications within scope and border of the claims or equivalents thereof.

We claim:

1. An antenna, comprising:

a plurality of radiating units arranged by column and comprising a plurality of radiating bodies and a reflecting plate which is configured to reflect a portion of electromagnetic waves radiated by the plurality of radiating bodies, such that the electromagnetic waves are radiated in a radiation orientation; and a dielectric component arranged in the radiation orientation of at least one radiating unit of the plurality of radiating units and comprising an undulating portion spaced apart from the at least one radiating unit by a distance, wherein a first undulating structure includes at least two adjacent first undulating units is provided on a lower surface of the undulating portion at least facing the at least one radiating unit in a transverse direction, the transverse direction being vertical to the column and parallel to the reflecting plate, wherein a second undulating structure includes at least two adjacent second undulating units is provided on an upper surface of the undulating portion away from the at least one radiating unit in the transverse direction, and wherein the second undulating structure and the first undulating structure have a same shape and dimension, such that the dielectric component has a uniform thickness.

2. The antenna of claim 1, wherein the dimension of the undulating portion is related to radiation frequency of the at least one radiating unit.

3. The antenna of claim 1, wherein the distance is an integer multiple of ¼ of a radiation wavelength of the at least one radiating unit.

4. The antenna of claim 1, wherein the undulating portion comprises:

a plurality of undulating units arranged along the transverse direction and each extending along the column, and wherein a width of each of the plurality of undulating units in the transverse direction is inversely proportional to a central frequency of a radiation band of the at least one radiating unit.

5. The antenna of claim 4, wherein an undulating unit of the plurality of undulating units comprises:

a pair of inclined segments at a predetermined angle to each other, wherein the predetermined angle is related to a band of the at least one radiating unit and the distance.

6. The antenna of claim 1, wherein a height of the undulating portion is inversely proportional to a central frequency of a radiation band of the at least one radiating unit.

7. The antenna of claim 1, wherein a sectional shape of the undulating portion comprises at least one of triangular wave shape, trapezoidal wave shape and sinusoidal wave shape.

8. The antenna of claim 1, wherein the at least one radiating unit is a high-frequency radiating unit of the plurality of radiating units.

9. The antenna of claim 1, further comprising:

an antenna radome arranged in the radiation orientation to cover the plurality of radiating units.

10. The antenna of claim 9, wherein the dielectric component is arranged inside the antenna radome or as at least a part of the antenna radome.

11. The antenna of claim 1, wherein the dielectric component is supported on the reflecting plate.

12. A base station, comprising at least one antenna of claim 1.

* * * * *